US011554631B2

(12) United States Patent
Paul et al.

(10) Patent No.: US 11,554,631 B2
(45) Date of Patent: Jan. 17, 2023

(54) PROGRAMMABLE CLIMATE CONTROLLER FOR A VEHICLE

(71) Applicant: RB Distribution, Inc., Colmar, PA (US)

(72) Inventors: John Peter Paul, Phoenixville, PA (US); Venkataramani Kumar, Chalfont, PA (US)

(73) Assignee: RB Distribution, Inc., Colmar, PA (US)

( * ) Notice: Subject to any disclaimer, the term of this patent is extended or adjusted under 35 U.S.C. 154(b) by 1088 days.

(21) Appl. No.: 16/170,739

(22) Filed: Oct. 25, 2018

(65) Prior Publication Data

US 2019/0126719 A1 May 2, 2019

Related U.S. Application Data

(60) Provisional application No. 62/577,500, filed on Oct. 26, 2017.

(51) Int. Cl.
*B60H 1/00* (2006.01)
*G05B 19/042* (2006.01)
*G06F 11/20* (2006.01)
*G06F 11/16* (2006.01)

(52) U.S. Cl.
CPC ..... *B60H 1/00585* (2013.01); *B60H 1/00592* (2013.01); *B60H 1/00642* (2013.01); *G05B 19/042* (2013.01); *G06F 11/1658* (2013.01); *G06F 11/2023* (2013.01); *G06F 11/2028* (2013.01); *G05B 2219/2614* (2013.01); *G05B 2219/2637* (2013.01)

(58) Field of Classification Search
CPC ........... B60H 1/00585; B60H 1/00592; B60H 1/00642; G05B 19/042; G05B 2219/2614; G05B 2219/2637; G06F 11/1658; G06F 11/2023; G06F 11/2028
See application file for complete search history.

(56) References Cited

U.S. PATENT DOCUMENTS

| 5,473,540 | A   | * | 12/1995 | Schmitz ............... G05B 19/042 701/34.2 |
|-----------|-----|---|---------|----------------------------------------------|
| 5,832,990 | A   |   | 11/1998 | Eisenhour |
| 5,995,889 | A   |   | 11/1999 | Eisenhour |
| 6,201,471 | B1  | * | 3/2001  | Jones ..................... B60K 35/00 340/461 |
| 7,272,476 | B2  |   | 9/2007  | Oritz et al. |
| 2006/0095166 | A1 | * | 5/2006  | Daly ................... B60R 11/0211 701/1 |
| 2007/0056301 | A1 |   | 3/2007  | Eisenhour |
| 2007/0096940 | A1 |   | 5/2007  | Laranang et al. |
| 2011/0304448 | A1 |   | 12/2011 | Kawamura et al. |
| 2013/0090820 | A1 | * | 4/2013  | Frashure ................. B60T 8/885 701/29.6 |
| 2014/0165026 | A1 |   | 6/2014  | McIntyre et al. |
| 2015/0007155 | A1 | * | 1/2015  | Hoffman ................... G06F 8/65 717/168 |
| 2015/0102900 | A1 |   | 4/2015  | Ramchandani et al. |
| 2016/0301177 | A1 | * | 10/2016 | Moran ................... H01R 43/24 |

* cited by examiner

Primary Examiner — Marc E Norman
(74) Attorney, Agent, or Firm — Volpe Koenig

(57) ABSTRACT

A programmable replacement controller that has a number of embedded applications corresponding to a number of OEM vehicle systems and a selected application within the controller can be called to service or activated through the programming feature of the replacement controller.

9 Claims, 12 Drawing Sheets

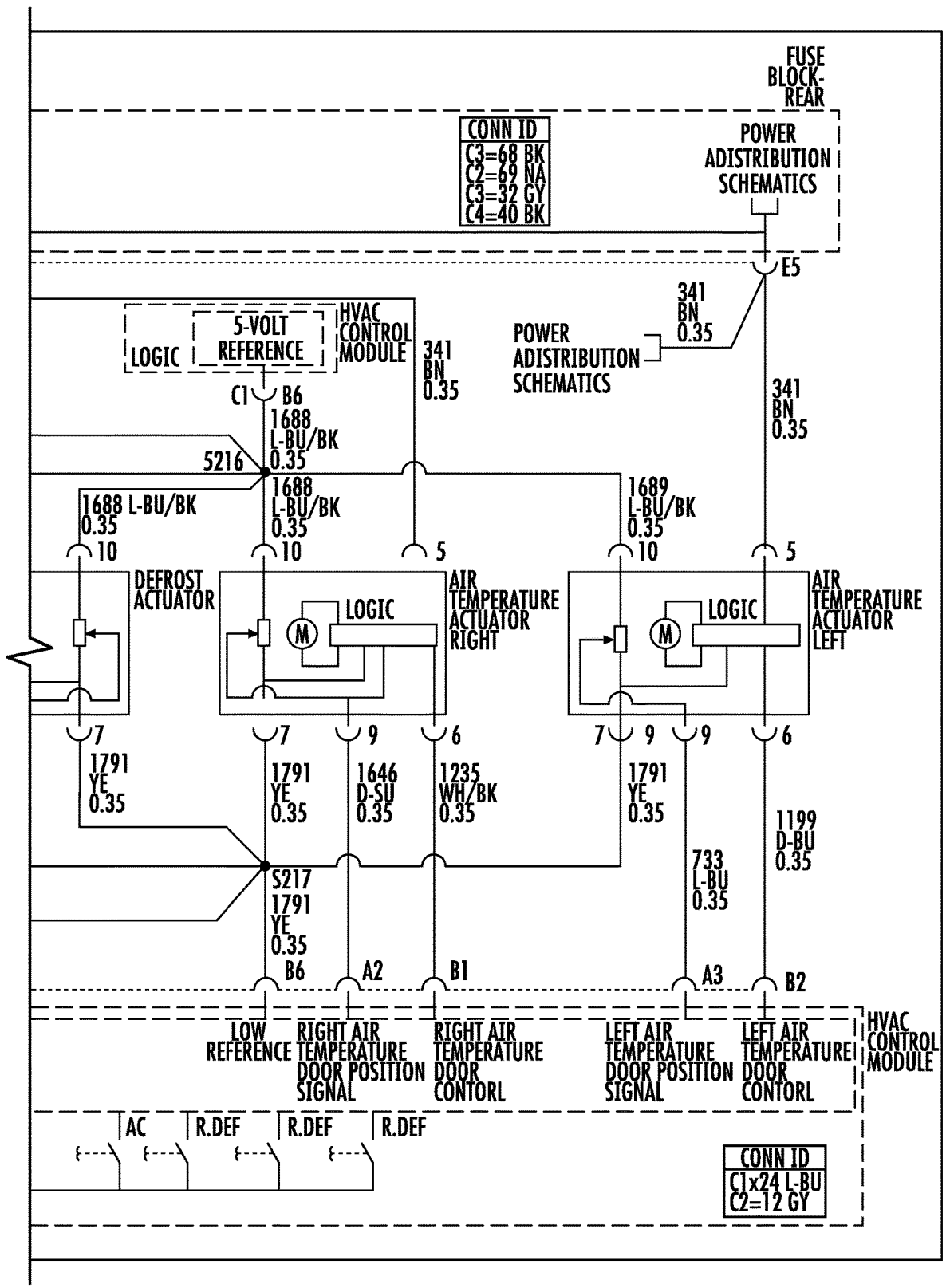
FIG. 4 CONTINUES

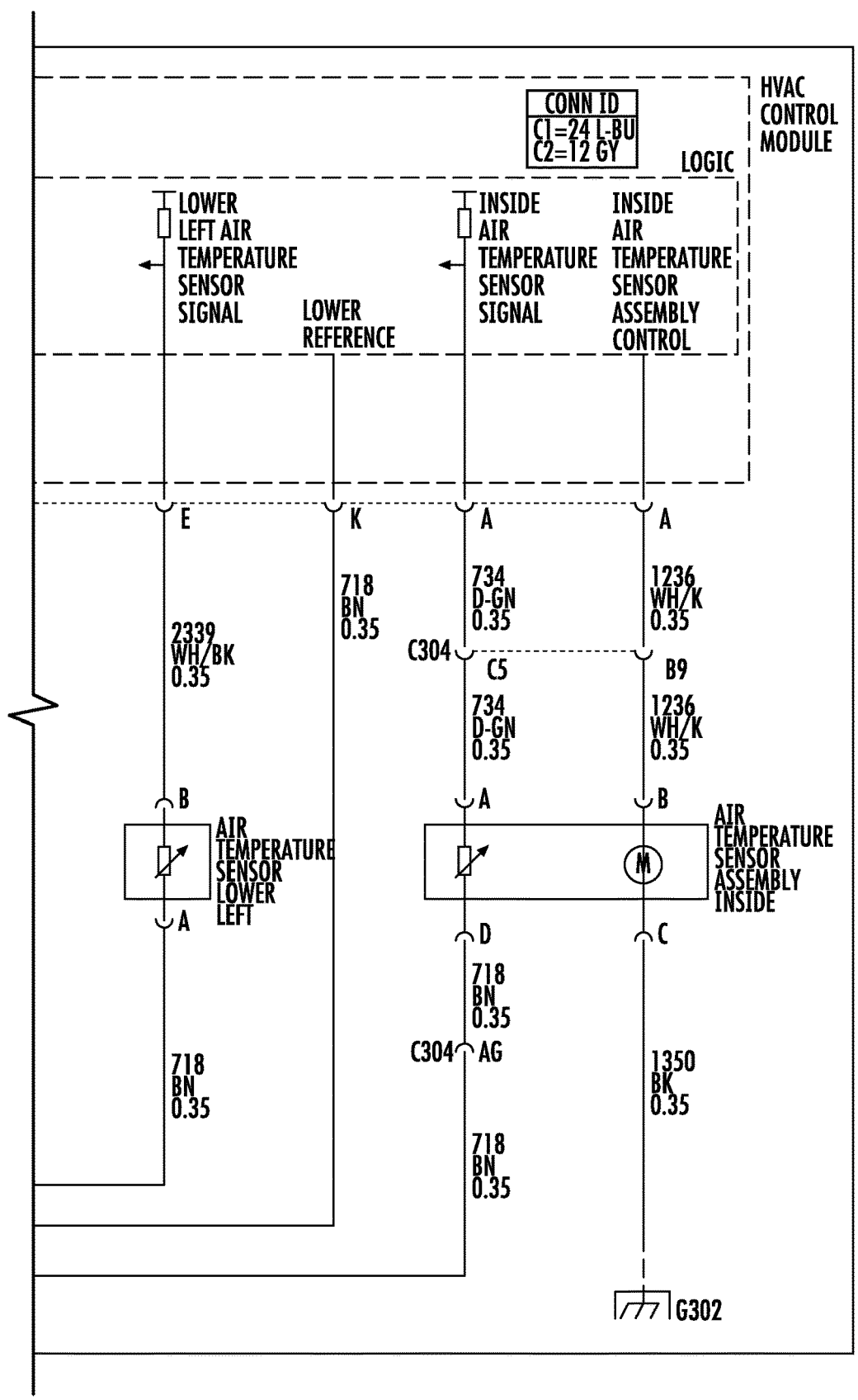
FIG. 5 CONTINUES

PROGRAMMABLE CLIMATE CONTROLLER FOR A VEHICLE

CROSS REFERENCES TO RELATED APPLICATIONS

This application claims the benefit of U.S. Provisional Application No. 62/577,500, filed Oct. 26, 2017, the entire contents of which are incorporated by reference herein as if fully set forth.

FIELD OF INVENTION

This invention relates to controls for managing the ambient climate conditions in a vehicle. More particularly, the invention relates to controlling the conditions in the passenger cabin of a vehicle using a heating, ventilation, and air conditioning (HVAC) system. Most particularly, the invention relates to a universal replacement controller that is configured as a replacement for a defective controller in a variety of vehicles.

BACKGROUND

The ambient conditions in a vehicle are subject to many variables from without and within the vehicle. External conditions, like sun, wind, rain, snow, and frost, influence passage comfort. Internal conditions, like the number and size of passengers, preferences for heating and cooling, compartment size can influence passage comfort. Addressing these ambient conditions is especially difficult when the Original Equipment Manufacture's (OEM) controller becomes defective or inoperative. While OEM replacement controllers may be available, they tend to be expensive and they can be difficult to find in the marketplace for older vehicles. It is sometimes possible to find used controller on the secondary market, such as at salvage yards; however, the second hand market can be risky and there are seldom guarantees as to their performance.

Moreover, suppliers and retailers have to provide a wide variety of replacement controllers for the OEM variety of different vehicles. Different OEM controllers will typically have variations such as different printed circuit board assembly (PCBA) arrangements and optional components such as rear defrost. This variation results in multiple product SKUs that necessitate increased handling and storage space along with increased manufacturing costs.

As a result of these conditions, the marketplace desires a reliable, less expensive option to the OEM replacement controllers. The present invention answers the marketplace need with a replacement controller that can be programmed according to the vehicle application.

SUMMARY

A method and apparatus for replacing an OEM climate controller is disclosed. A single controller has a number of embedded applications and the selected application within the controller can be called to service through the programming feature of the replacement controller.

In one aspect, the present disclosure is directed to a method for matching a programmable replacement climate controller to a vehicle, including the steps of identifying a vehicle by make, model and year; selecting a programmable climate controller that has embedded climate control data compatible with the identified vehicle's existing climate control data and established programming procedures; identifying the location of the embedded data that is compatible with the identified vehicle's existing climate control data; accessing the identified location of the embedded data; and, following the established programming procedures.

In another aspect, the present disclosure is directed to a programmable replacement climate controller comprising embedded climate control data, programming controls for accessing, a connector half, and programming controls that activate. The embedded climate control data is compatible with existing OEM climate control data for a plurality of vehicle groups stored in a memory. The programming controls for accessing are for accessing the embedded climate control data compatible with existing OEM climate control data and extracting embedded climate control data compatible with a selected vehicle group among the plurality of vehicle groups.

DETAILED DESCRIPTION OF THE PREFERRED EMBODIMENTS

Figure 1:
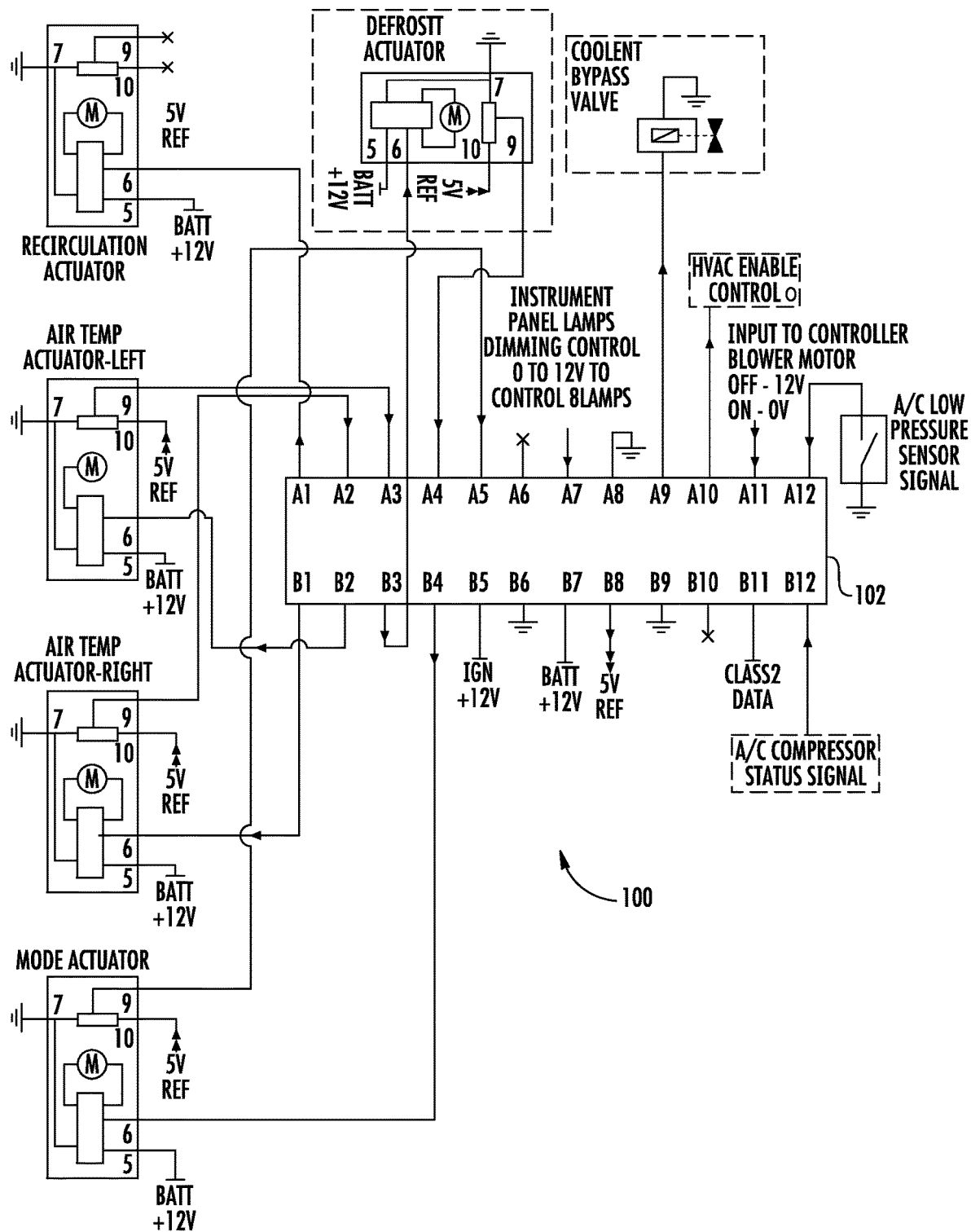
FIG. 1 is a schematic illustration representative of ng the various features and controlled parameters and their pin arrangement in one half of a typical OEM connector assembly.
Figure 2:
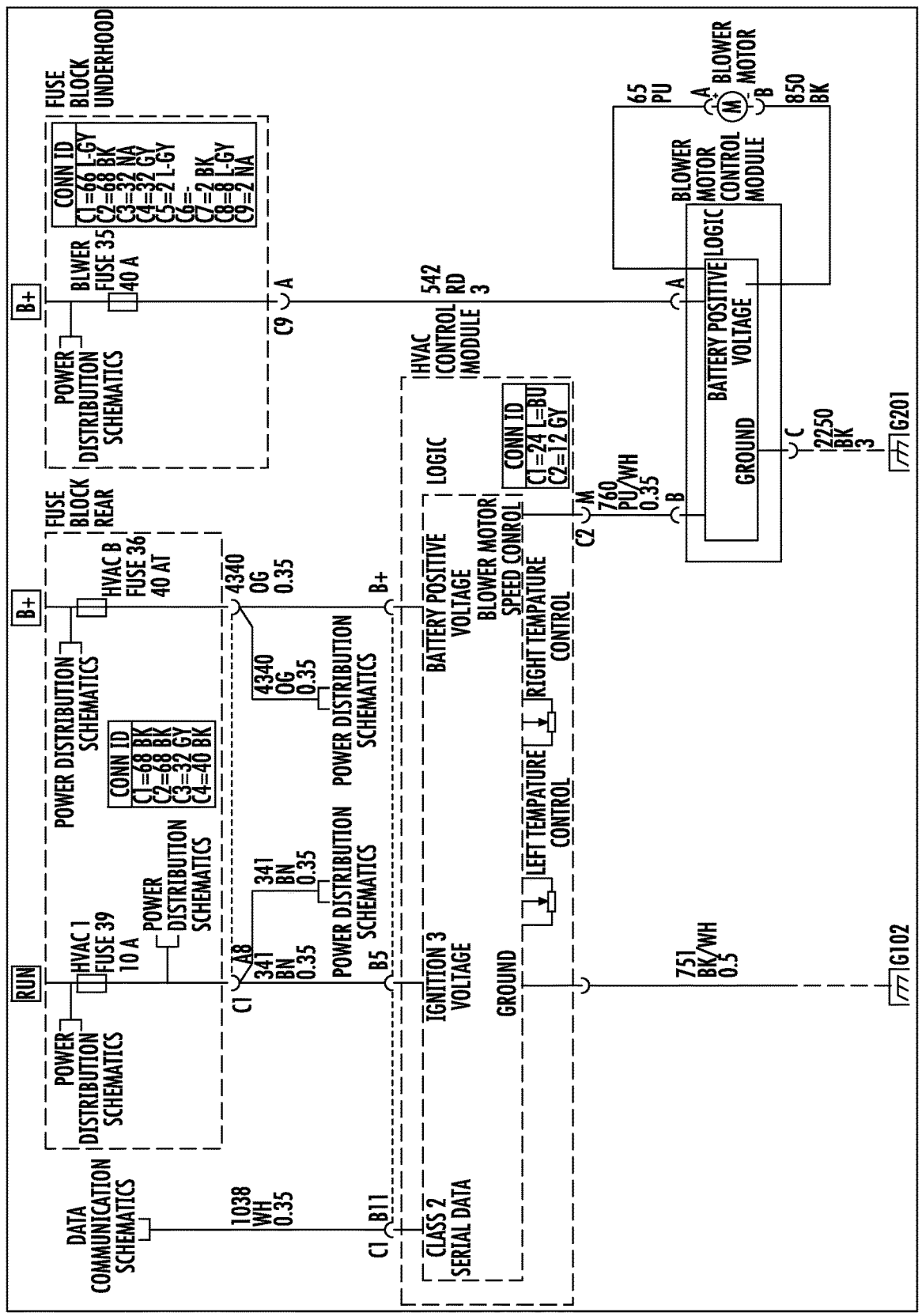
FIGS. 2 through 7 are schematic illustrations that expand the wiring harness illustrated in FIG. 1.
Figure 3:
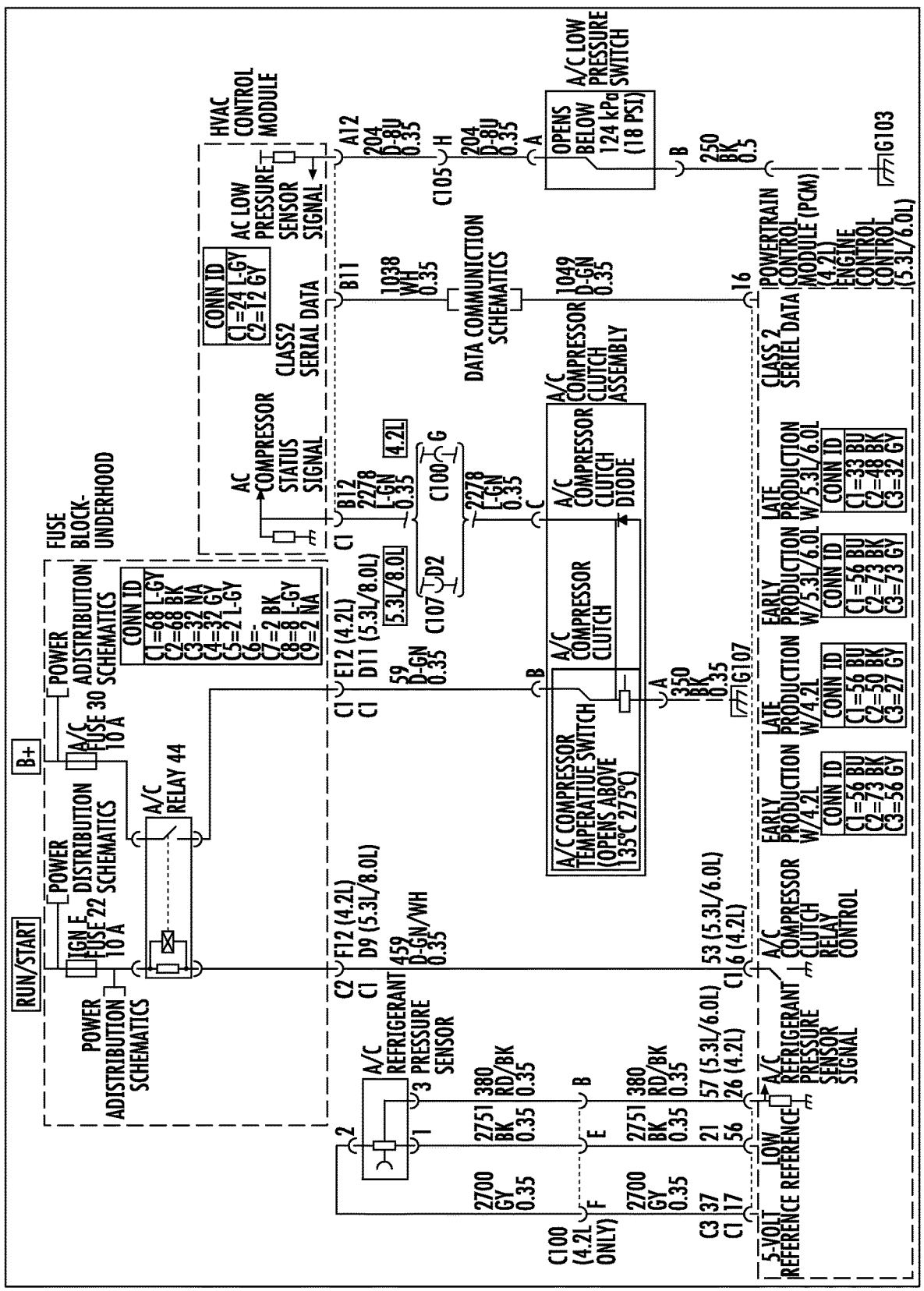
Figure 4:
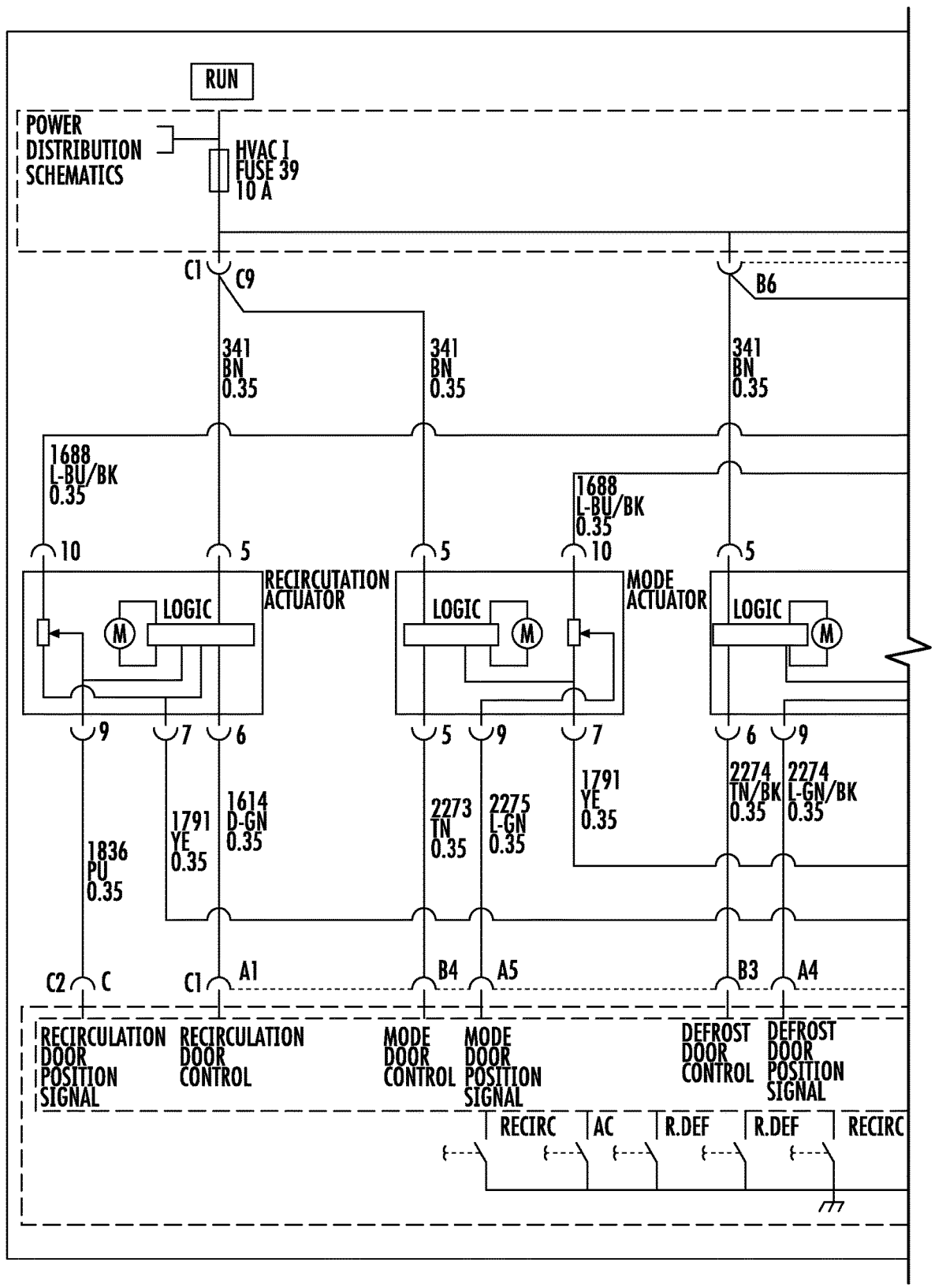
Figure 5:
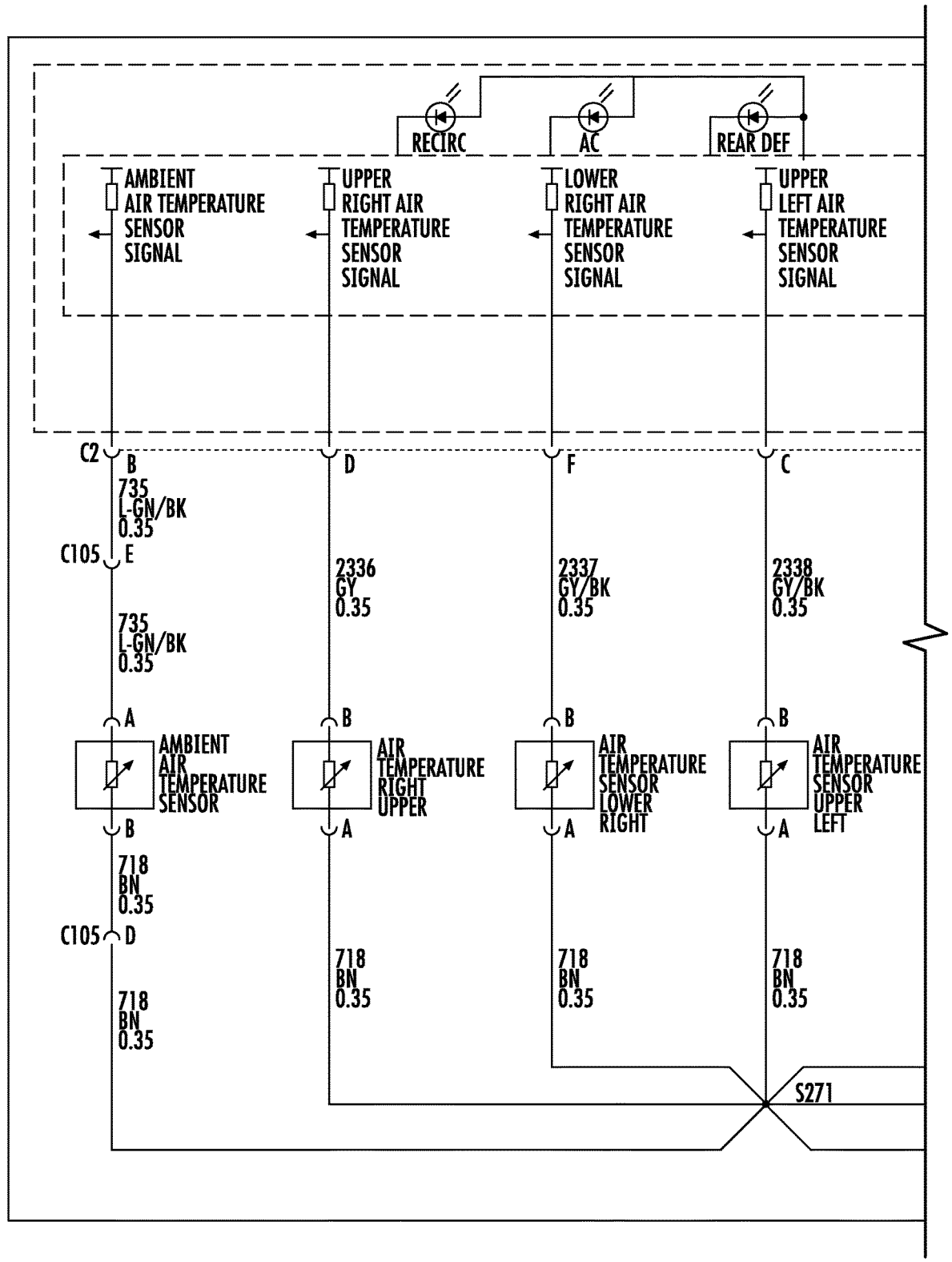
Figure 6:
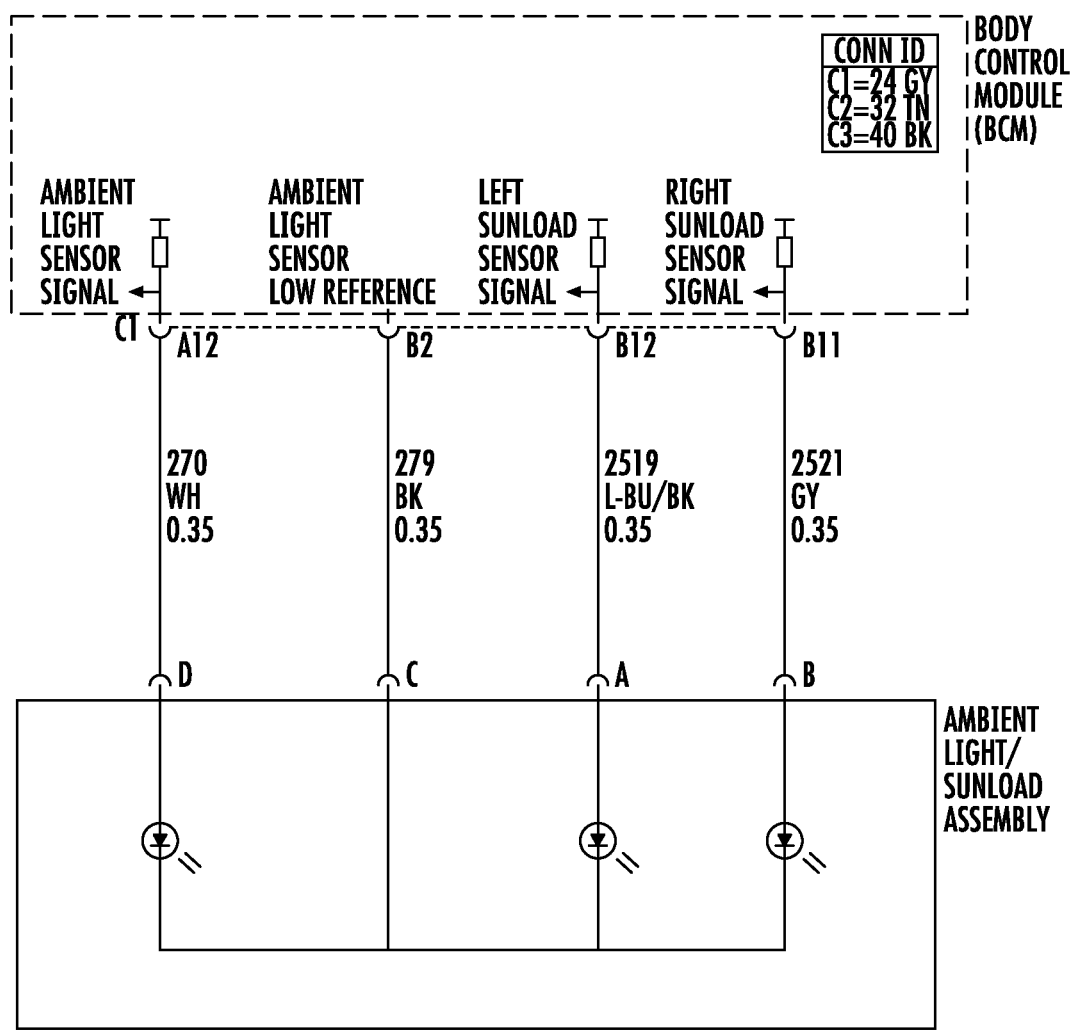
Figure 7:
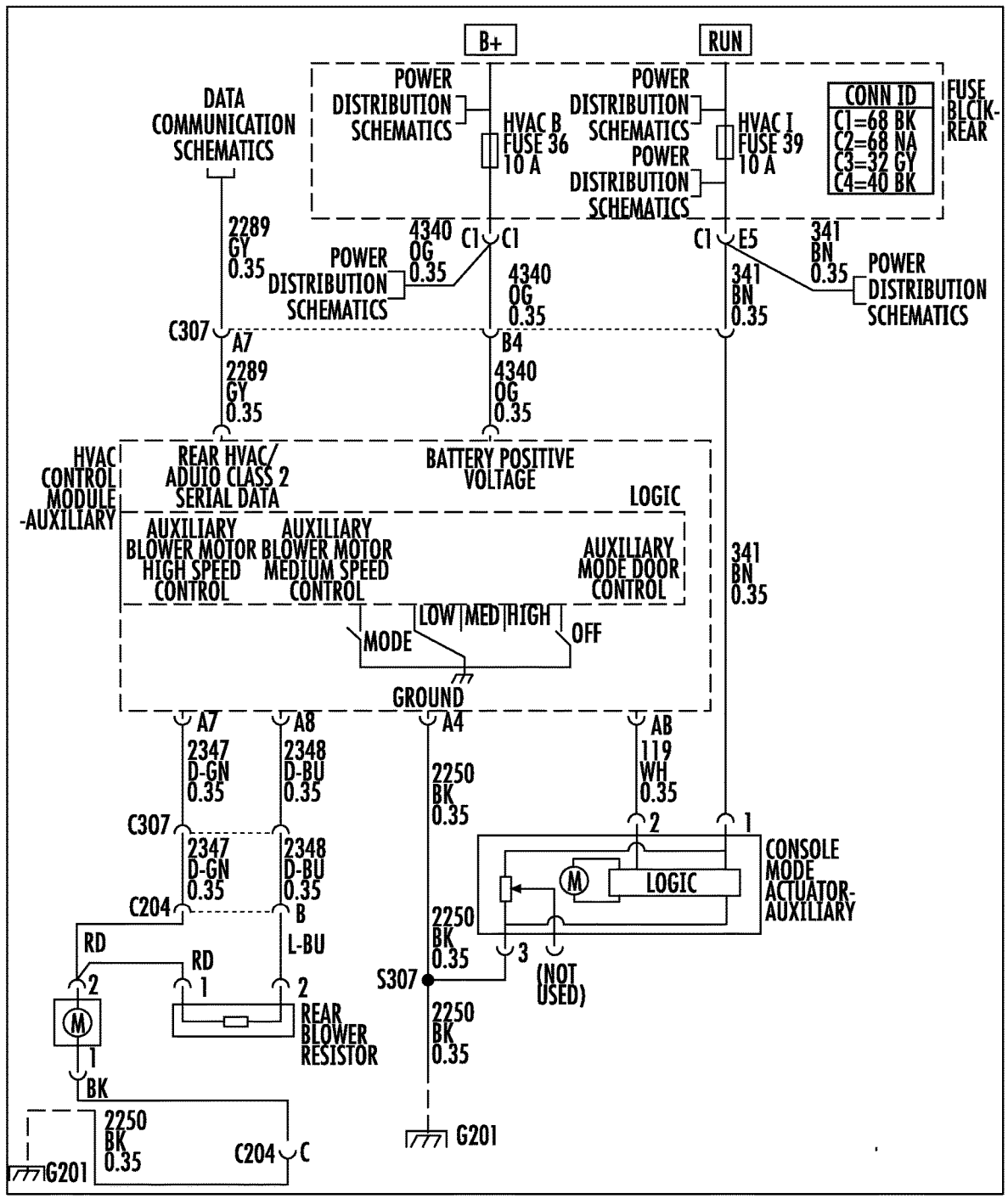

With reference to FIG. 1, it can be seen that an exemplary OEM climate control system 100 has a number of designated locations for certain components within the vehicle's OEM wiring harness and those designations terminate on specific pins of the twenty-four pin connector half 102. In the exemplary climate control system 100 connector half 102 comprises twenty-four pin locations marked A1-A12 and B1-B12 with HVAC components connected to the pin locations. As illustrated in FIG. 1, a Recirculation Actuator has input from A1. A Defrost Actuator has input from B3 and outputs to A4. A Coolant Bypass Valve has input from A9. An HVAC Enable Control has input from A10. Input to Controller Blower Motor outputs to A11. An A/C Pressure Sensor Signal outputs to A12. An A/C Compressor Status Signal outputs to B12. A Mode Actuator has input from B4 and outputs to A5. A Right Air Temp Actuator has input from B1 and outputs to A2. A Left Air Temp Actuator has input from B2 and outputs to A3.

Figure 8A:
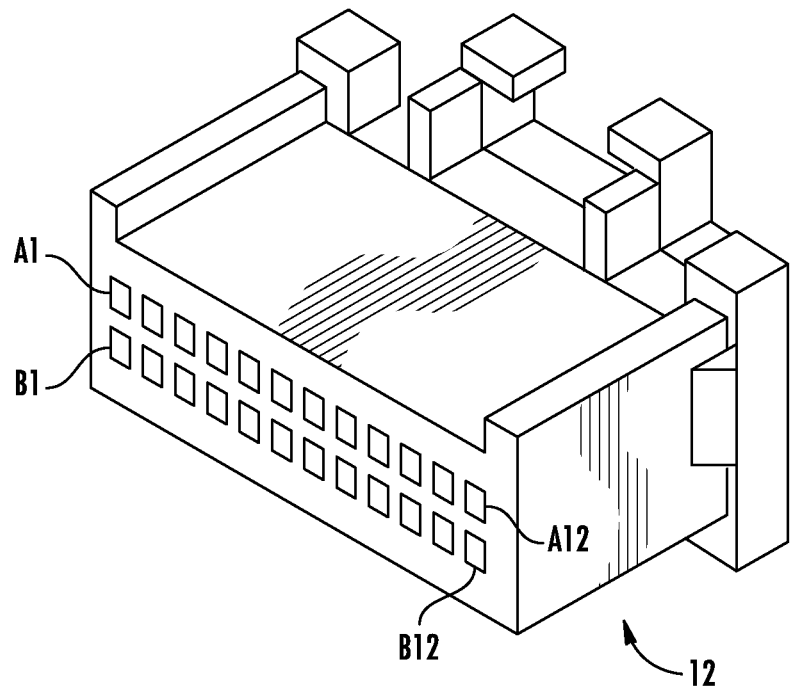
FIG. 8A is a perspective view of a 24-pin connector half for a control module connectable to the half of FIG. 1.
Figure 8B:
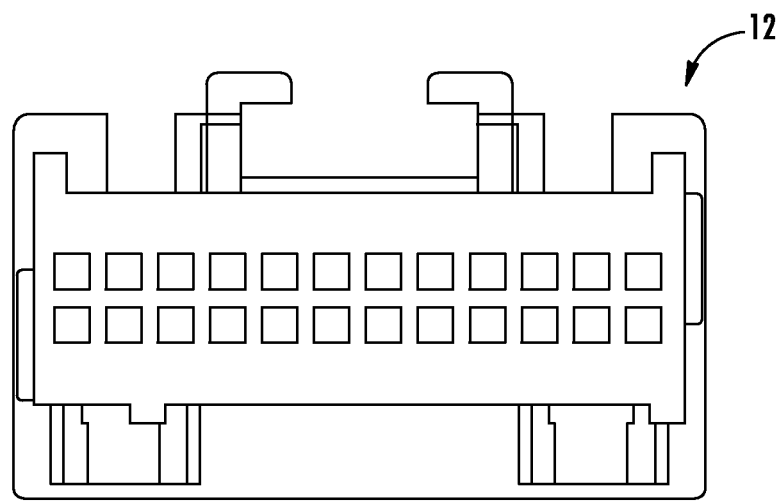
FIG. 8B is a front elevation view of the connector of FIG. 8A.
Figure 10:
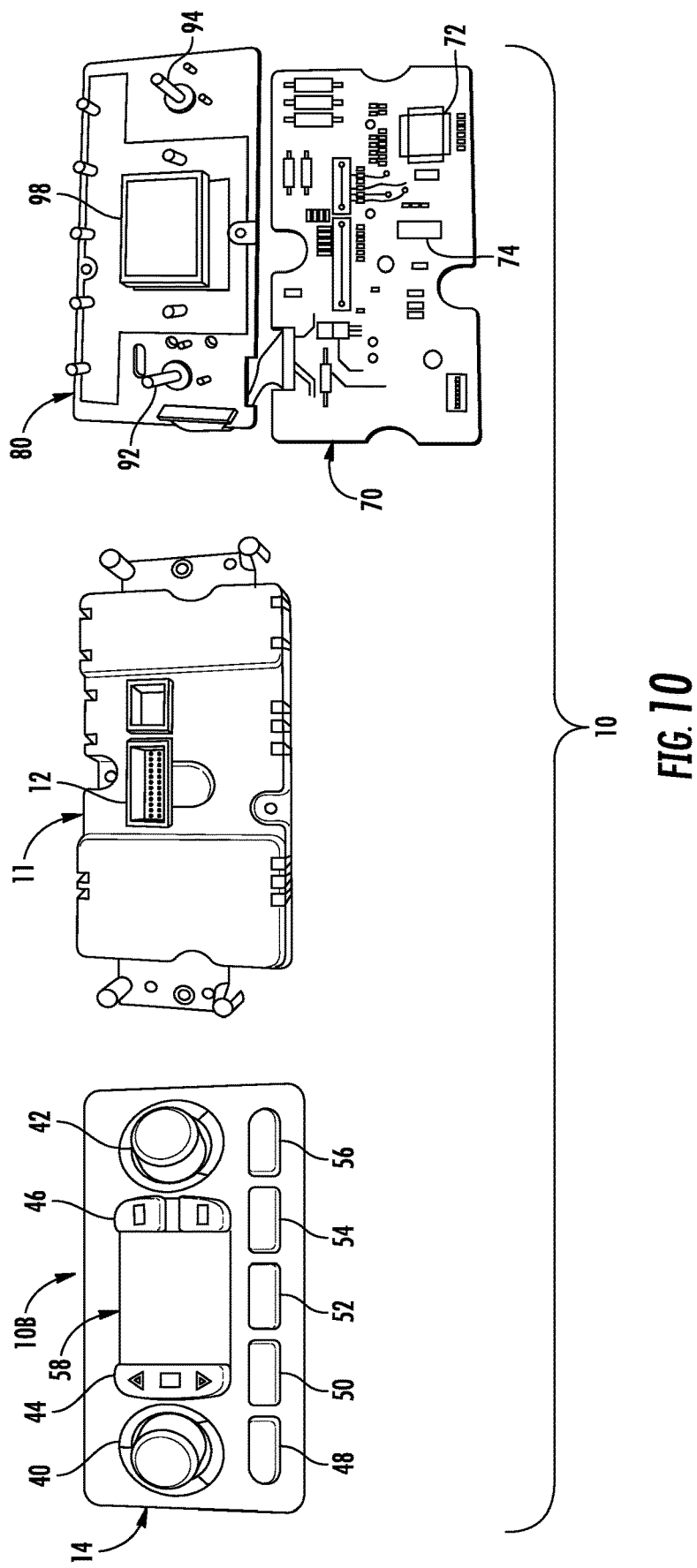
FIG. 10 is an exploded view of an exemplary digital controller face panel, replacement control module, and circuit boards.

In the present invention, the replacement controller 10 has a compatible twenty-four pin connector half 12, shown in FIGS. 8A, 8B, and 10 that is a direct plug connection to the existing elements of the OEM system 100. As discussed further below, the replacement controller 10 is configurable by vehicle to have the controller pins functionally compatible with a plurality of OEM climate control systems.

FIGS. 2 through 7 illustrate more detailed representative schematics for the elements of the OEM system 100. In particular, FIGS. 2-7 show the electrical schematic diagram for the climate control system of a 2007 Buick Rainier. One of ordinary skill in the art would appreciate that different vehicles have variations in the electrical schematics of their HVAC systems that are nonetheless applicable to a suitable replacement controller 10 as disclosed in the present invention.

Figure 9:
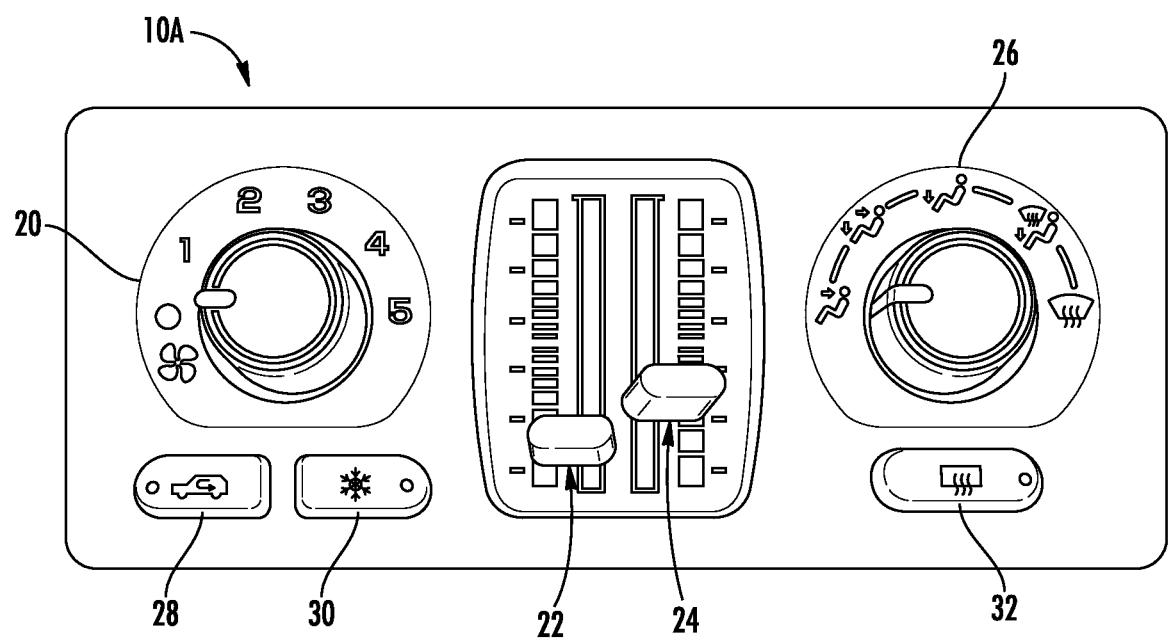
FIG. 9 illustrates an exemplary dual slide controller face panel.

FIG. 9 shows the face panel of a replacement controller 10A according to the present invention with a plurality of control elements 20-32 that are used to accomplish configuration and activation in the manner discussed further below and for user operations after the activation programming is completed. Some features, such as rear defrost, are optional on vehicles. In order to provide a single replacement controller 10A applicable to vehicles with or without this feature, the controller can be provided with a variable feature slot that is covered by a removable plate or weakened portion of the cover plate that may be removed without damaging the cover plate. When removed, this variable feature provides a connection point for a functional button 32 that will enable the additional feature.

Because the pin allocations for all target vehicles are not identical and all models may not have all pins operational or active, the replacement unit 10 has a first PCBA 70 (FIG. 10) including a memory module 72 that is preloaded with assignment instructions software for a number of vehicles. Since all models or model years from the same OEM may not have identical features, it is necessary for the software in memory to recognize the target vehicle, the features in that vehicle and the associated pins so that the correct information from the memory software can upload or activate for the target vehicle. It is also important to identify the pin assignments correctly because other features are controlled by the vehicle's onboard computers and the replacement unit 10 must not interfere with the normal operation of any other vehicle features.

The exploded view in FIG. 10 shows a faceplate 14 with digital control elements 40-56 that are used to accomplish configuration and activation as discussed below. The replacement controller 10 also includes a back plate 11 including the connector half 12, a first PCBA or board 70, and a second PCBA or board 90 with control components 92, 94 and a LCD system 98. However, the boards 70, 90 in this exploded view have the same functionality as the earlier faceplate configuration.

The first and second PCBA 70, 90 house the electronic components of the replacement controller 10. The memory 72 stores identifying information for a plurality of vehicles, and may also store configuration and calibration software instructions for a plurality of vehicles. A processor 74 communicates with and controls other components on the first and second PCBA 70, 90, and the processor may contain embedded applications for configuration and calibration of the replacement controller 10. Other electronic components may include network components (including wireless communication components), power components, integrated circuits for implementing any of the above, and the like.

The process of installing the replacement controller 10 begins with identifying the target vehicle in a look-up table and then following the programming steps for the vehicle as shown in a procedure such as the example below. These instructions are applicable to the exemplary digital climate controller 10B shown in FIG. 10 having operative user inputs 40-56 that are typically used for regular operation of the climate controller 10 when fully installed. The particular buttons and displays described below are exemplary, but other button(s) and displays are contemplated to conform to other OEM components and procedures.

Exemplary Configuration Selection Instructions:

STEP 1: Start the vehicle (the engine must be running).

STEP 2: Enter configuration mode: Press and hold the "Power" 48 and "Front Defrost" 54 buttons until the LCD Screen 58 displays the default configuration number (e.g., "04").

STEP 3: Find the Configuration # for a given vehicle from a reference table such as Table 1.

STEP 4: Select vehicle: Select your vehicle's Configuration Number by pressing the "Fan Up" or "Fan Down" buttons 44. The first digit on the display 58 will change to a "5" (indicating the configuration needs to be set).

STEP 5: Set configuration: Once the desired configuration is displayed, press and release the "recirculation" button 50. The first digit will change back to a "0" (indicates the configuration has been set).

STEP 6: Confirm: Press and release the "auto" button 46 to confirm. The LCD Screen 58 returns to normal operating display information.

STEP 7: Internal calibration: Wait while the system performs a calibration sequence indicated by the recirculation 50 and front defrost 54 button lamps being illuminated. This sequence may take up to, e.g., one minute. Configuration is complete when one or both of these button lamps 50, 54 turn off.

In a representative air delivery system, there are multiple factors with multiple internal variables that must be addressed to provide a replacement unit that will operate in the same manner as the end user has experienced with the OEM unit.

A replacement controller 10 of the present invention will have a plurality of configurations available in memory which are selectable by a user and then executed by a process similar to that above. The replacement controller may have, for example, two to ten such configurations, and each configuration may be applicable to multiple vehicle models and model years.

An exemplary replacement controller 10 with configurations corresponding to different models and years of vehicles is illustrated in Table 1 below.

| Configurations | Vehicle Applications |
| --- | --- |
| 01 | 2003-2004 Cadillac Escalade; 2003-2004 Chevrolet Avalanche, Silverado, Suburban, and Tahoe; and 2003-2004 GMC Sierra and Yukon. |
| 02 | 2007 Chevrolet Silverado; 2007 GMC Sierra; 2005-2006 Cadillac Escalade; 2005-2006 Chevrolet Avalanche, Silverado, Suburban, and Tahoe; 2005-2006 GMC Sierra and Yukon. |
| 03 | 2003-2007 Hummer H2. |
| 04 | 2004 Buick Rainier, 2003-2004 Chevrolet Trailblazer, 2003-2004 GMC Envoy, and 2003-2004 Oldsmobile Bravada. |
| 05 | 2005-2006 Buick Rainier, 2005-2006 Chevrolet Trailblazer, and 2005-2006 GMC Envoy. |
| 06 | 2002 Chevrolet Trailblazer, 2002 GMC Envoy, and 2002 Oldsmobile Bravada. |
| 07 | 2007 Buick Rainier and 2007-2009 Chevrolet Trailblazer. |

The replacement controller 10 illustrated in Table 1 provides a single replacement device that can replace several OEM controllers. OEM vehicles of a given configuration (e.g., the 2007 Buick Rainier and 2007-2009 Chevrolet Trailblazer) may be considered a "vehicle group" where multiple OEM vehicle types correspond to a single replacement configuration. Thus, a "vehicle group" may be a single model in multiple years like Configuration 03 above or multiple models in a single year like Configuration 06 above.

A second exemplary configuration selection procedure is based on holding one or more selected programming elements for a selected time to scroll through the available configurations. A default configuration can be made available based on vehicle popularity and service data and, if the vehicle corresponds to the default configuration, the selection procedure may not be necessary. A second configuration can be selected by: pressing and holding both the Recirculation button 50 and an AC button 52 for five to ten seconds. A corresponding third configuration selection procedure includes: press and hold Recirculation button 50 and the AC button 52 for ten to fifteen seconds. A corresponding procedure for returning to the first (default configuration) includes: press and hold the Recirculation button 50 and the AC button 52 for sixteen to twenty seconds. This configuration selection procedure may have a vehicle state prerequisite such as ignition being off and blower being not in off mode.

FIG. 10 shows multiple views of an exemplary digital programmable replacement climate controller 10B. The face of the unit 10B, shown of the left in FIG. 10, has a number of user inputs 40-56 that enable a user to select a feature and personalize that feature, such as fan speed, temperature, air conditioning, inside/outside air, etc. to the user's preferences. As described above, when the replacement controller 10B is being installed, the user inputs serve as programming controls. Once the vehicle identification is entered, the inputs 40-56 shift to programming and, after the programming is completed they shift back to user inputs. The connector 12 for the replacement climate controller 10 is shown in the center 11 of FIG. 10. The circuit boards 70, 90 with the memory 72, processor 74, and associated components to achieve compatibility are shown on the right side of FIG. 10.

The physical characteristics (e.g., size, shape, proportion) of the replacement controller 10 and its constituent parts may be designed to fit within various vehicle dashboards. Although the faceplate 14 is illustrated as substantially planar, it may instead be convexly curved to conform to a particular dashboard shape. Likewise the faceplate 14 may be an oval, trapezoid, or any other shape suitable to replace an OEM controller and fit an OEM dashboard. The length, width, and depth of the faceplate 14, back plate 11, and first and second PCBA 70, 90 may likely be modified as dictated by the spatial constraints of the OEM dashboard. In this manner, the replacement unit 10 will provide a suitable fit and finish for the vehicle and will maintain the aesthetic quality of the vehicle interior.

One skilled in the art will appreciate that replacement unit 10 must communicate in the language of the OEM and operational aspect of the OEM system 100 and replacement unit 10 must mirror each other. As such, a replacement unit 10 applicable to the present invention may be capable of communicating in multiple languages or configurable by an installer to communicate in a selected one of the multiple languages.

Moreover, one of ordinary skill in the art would recognize that any suitable hardware may be employed for the embodiments described above, particularly the first and second PCBAs 70, 90. Data, including vehicle identifying information, embedded configurations, and stored instructions, may be stored in the memory 72 of the first PCBA, in a memory on the second PCBA 90, or in additional storage hardware, permanently or temporarily. Furthermore, the instructions described herein may be implemented in a computer program, software, or firmware incorporated in a computer-readable medium for execution by a computer or processor.

Examples of computer-readable media include electronic signals (transmitted over wired or wireless connections) and non-transitory computer-readable storage media. Examples of non-transitory computer-readable storage media include, but are not limited to, a read only memory (ROM), a random access memory (RAM), a register, cache memory, semiconductor memory devices, magnetic media, such as internal hard disks and removable disks, magneto-optical media, and optical media such as CD-ROM disks, and digital versatile disks (DVDs). As such, a computer-readable medium, computer, processor, and/or non-transitory computer-readable storage media may be incorporated in any of the components described above, or in additional hardware.

What is claimed is:

1. A method for matching a programmable replacement controller to a vehicle from an original equipment manufacturer (OEM) that has an existing onboard system, the method comprising the steps of:
   identifying a vehicle by an OEM's make, model and year;
   providing a replacement controller that has embedded control data that includes OEM control data compatible with the existing onboard system of the identified vehicle and programming directions for applying OEM control data from the embedded control data to the existing onboard system;
   identifying a location within the embedded control data where there is a specific portion of control data that is compatible with the identified vehicle's OEM control data in the existing onboard system;
   selecting the specific control data portion that is compatible with the identified vehicle's OEM control data in the existing onboard system; and,
   using the programming directions for applying the specific portion of control data to replacement controller.

2. The method of claim 1, further comprising the step of providing a face plate that includes a display screen.

3. The method of claim 2, further comprising the step of providing embedded data locations on the display screen.

4. The method of claim 1, further comprising the step of providing a connector half on the replacement controller that is configured to operatively connect with a connector half associated with an existing OEM wiring harness.

5. A programmable replacement controller comprising:
   a memory that stores selectable portions of controller data that is compatible with a plurality of OEM (original equipment manufacturer) vehicle groups;
   a first set of programming controls for selecting a portion of data from the selectable portions that is compatible with controller features embedded in existing on board control data associated with a selected vehicle group among the plurality of OEM vehicle groups; and,
   a second set of programming controls for applying the selected portion of data from the selectable portions in the memory for the selected vehicle group from among the plurality of OEM vehicle groups rendering the replacement controller operative in the selected vehicle group.

6. The programmable replacement controller of claim 5, further comprising a faceplate that holds the first set and the second set of programming controls, and a back plate wherein a connector half is mounted on the back plate and configured to operatively connect with a connector half associated with an existing OEM wiring harness.

7. The programmable replacement controller of claim 6, wherein the programming controls on the faceplate are user inputs.

8. The programmable replacement controller of claim 5, wherein the memory has selectable portions of controller data that are compatible with at least three vehicle groups.

9. The programmable replacement controller of claim 5, wherein the programmable replacement controller is contained within a housing and has a connector half with a plurality of pins positioned to mate with selected pins among a plurality of pins in an OEM connector half associated with an existing wire harness in the selected vehicle.

* * * * *